US009200553B2

(12) United States Patent
Gonze et al.

(10) Patent No.: US 9,200,553 B2
(45) Date of Patent: Dec. 1, 2015

(54) POWER SYSTEM AND METHOD FOR ENERGIZING AN ELECTRICALLY HEATED CATALYST

(75) Inventors: Eugene V. Gonze, Pinckney, MI (US); Michael J. Paratore, Jr., Howell, MI (US); Christopher J. Kalebjian, Columbus, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 798 days.

(21) Appl. No.: 13/097,552

(22) Filed: Apr. 29, 2011

(65) Prior Publication Data

US 2012/0277973 A1 Nov. 1, 2012

(51) Int. Cl.
| | |
|---|---|
| *F01N 3/10* | (2006.01) |
| *F01N 3/20* | (2006.01) |
| *F01N 13/00* | (2010.01) |
| F02D 41/14 | (2006.01) |

(52) U.S. Cl.
CPC ............. *F01N 3/103* (2013.01); *F01N 3/2013* (2013.01); *F01N 13/0097* (2014.06); F02D 41/1446 (2013.01); F02D 2200/0802 (2013.01); Y02T 10/26 (2013.01)

(58) Field of Classification Search
CPC ............... F01N 3/24; F01N 3/20; F01N 3/18; F01N 3/2026; F01N 9/00; F01N 13/009; F01N 3/103; F01N 3/2013; F01N 13/0097; F02D 43/00; F02D 41/1446; F02D 2200/0802; Y02T 10/26
USPC ..................... 60/274–303; 701/102
See application file for complete search history.

(56) References Cited

U.S. PATENT DOCUMENTS

| | | | | |
|---|---|---|---|---|
| 5,345,761 | A * | 9/1994 | King et al. | 60/274 |
| 5,444,976 | A | 8/1995 | Gonze et al. | |
| 5,904,902 | A * | 5/1999 | Matuoka et al. | 422/174 |
| 5,966,931 | A * | 10/1999 | Yoshizaki et al. | 60/284 |
| 7,104,051 | B2 * | 9/2006 | Shimasaki et al. | 60/297 |
| 8,209,970 | B2 * | 7/2012 | Gonze et al. | 60/303 |

(Continued)

FOREIGN PATENT DOCUMENTS

| | | |
|---|---|---|
| CN | 101306685 A | 11/2008 |
| CN | 101592092 A | 12/2009 |

OTHER PUBLICATIONS

Correspondence dated Aug. 28, 2014 regarding Chinese Office Action dated Aug. 9, 2014 for CN Application No. 201210127636.3; 1 pg.

*Primary Examiner* — Jesse Bogue
*Assistant Examiner* — Kelsey Stanek
(74) *Attorney, Agent, or Firm* — Cantor Colburn LLP

(57) ABSTRACT

A power system and a method for energizing an electrically heated catalyst are provided. The system includes a battery outputting a first voltage, and a generator outputting a second voltage greater than the first voltage in response to a first signal. The system further includes a controller that generates a second signal to set a first switching device to a first operational state to apply the second voltage to the electrically heated catalyst to increase a temperature of the catalyst, if a first temperature level of the catalyst is less than a first threshold temperature level. The controller generates a third signal to induce the generator to output a third voltage, and generates a fourth signal to set a second switching device to a second operational state to apply the first voltage to the catalyst, if the first temperature level is greater than the first threshold temperature level.

9 Claims, 4 Drawing Sheets

(56) References Cited

U.S. PATENT DOCUMENTS

| | | | |
|---|---|---|---|
| 2008/0233471 A1* | 9/2008 | Aumayer et al. | 429/92 |
| 2009/0293450 A1* | 12/2009 | Gonze et al. | 60/274 |
| 2014/0102083 A1* | 4/2014 | Baetge et al. | 60/299 |

* cited by examiner

POWER SYSTEM AND METHOD FOR ENERGIZING AN ELECTRICALLY HEATED CATALYST

FIELD OF THE INVENTION

Exemplary embodiments of the invention relate to a power system and a method for energizing an electrically heated catalyst in a vehicle.

BACKGROUND

Internal combustion powered vehicles have utilized an electrically heated catalyst in an exhaust system. The electrically heated catalyst is energized utilizing an operational voltage of 12 volts from a battery of the motor vehicle. Also, a vehicle electrical system includes a generator that supplies a voltage to the battery and to vehicle electrical loads along with the electrically heated catalyst. When the operational voltage is supplied from the battery to the electrically heated catalyst, a temperature of the catalyst may increase such that hydrocarbons in exhaust gases are combusted within the electrically heated catalyst. However, when the operational voltage is subsequently removed from the electrically heated catalyst, the hydrocarbons in the exhaust gases flowing through the electrically heated catalyst may cool down the catalyst such that combustion of the hydrocarbons stop within the catalyst.

SUMMARY OF THE INVENTION

In an exemplary embodiment of the invention, a power system for energizing an electrically heated catalyst is provided. The electrically heated catalyst is disposed upstream of an oxidation catalyst. The power system includes a battery configured to output a first voltage. The power system further includes a generator configured to output a second voltage greater than the first voltage in response to receiving a first control signal. The power system further includes a controller configured to generate a second control signal to set a first switching device to a first operational state such that the second voltage from the generator is applied through the first switching device to the electrically heated catalyst to increase a temperature of the electrically heated catalyst, if a first temperature level of the electrically heated catalyst is less than a first threshold temperature level. The controller is further configured to generate a third control signal to induce the generator to output a third voltage equal to the first voltage. The controller is further configured to stop generating the second control signal to set the first switching device to a second operational state such that the second voltage from the generator is not applied through the first switching device to the electrically heated catalyst. The controller is further configured to generate a fourth control signal to set a second switching device to a second operational state such that the first voltage from the battery is applied through the second switching device to the electrically heated catalyst to increase the temperature of the electrically heated catalyst, if the first temperature level is greater than or equal to the first threshold temperature level.

In another exemplary embodiment of the invention, a method for energizing an electrically heated catalyst is provided. The electrically heated catalyst is disposed upstream of an oxidation catalyst. The method includes outputting a first voltage from a battery. The method further includes outputting a second voltage from a generator that is greater than the first voltage in response to the generator receiving a first control signal. The method further includes utilizing a controller to generate a second control signal to set a first switching device to a first operational state such that the second voltage from the generator is applied through the first switching device to the electrically heated catalyst to increase a temperature of the electrically heated catalyst, if a first temperature level of the electrically heated catalyst is less than a first threshold temperature level. The method further includes utilizing the controller to generate a third control signal to induce the generator to output a third voltage equal to the first voltage. The method further includes stopping the generating of the second control signal to set the first switching device to a second operational state such that the second voltage from the generator is not applied through the first switching device to the electrically heated catalyst. The method further includes utilizing the controller to generate a fourth control signal to set a second switching device to a second operational state such that the first voltage from the battery is applied through the second switching device to the electrically heated catalyst to increase the temperature of the electrically heated catalyst, if the first temperature level is greater than or equal to the first threshold temperature level.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
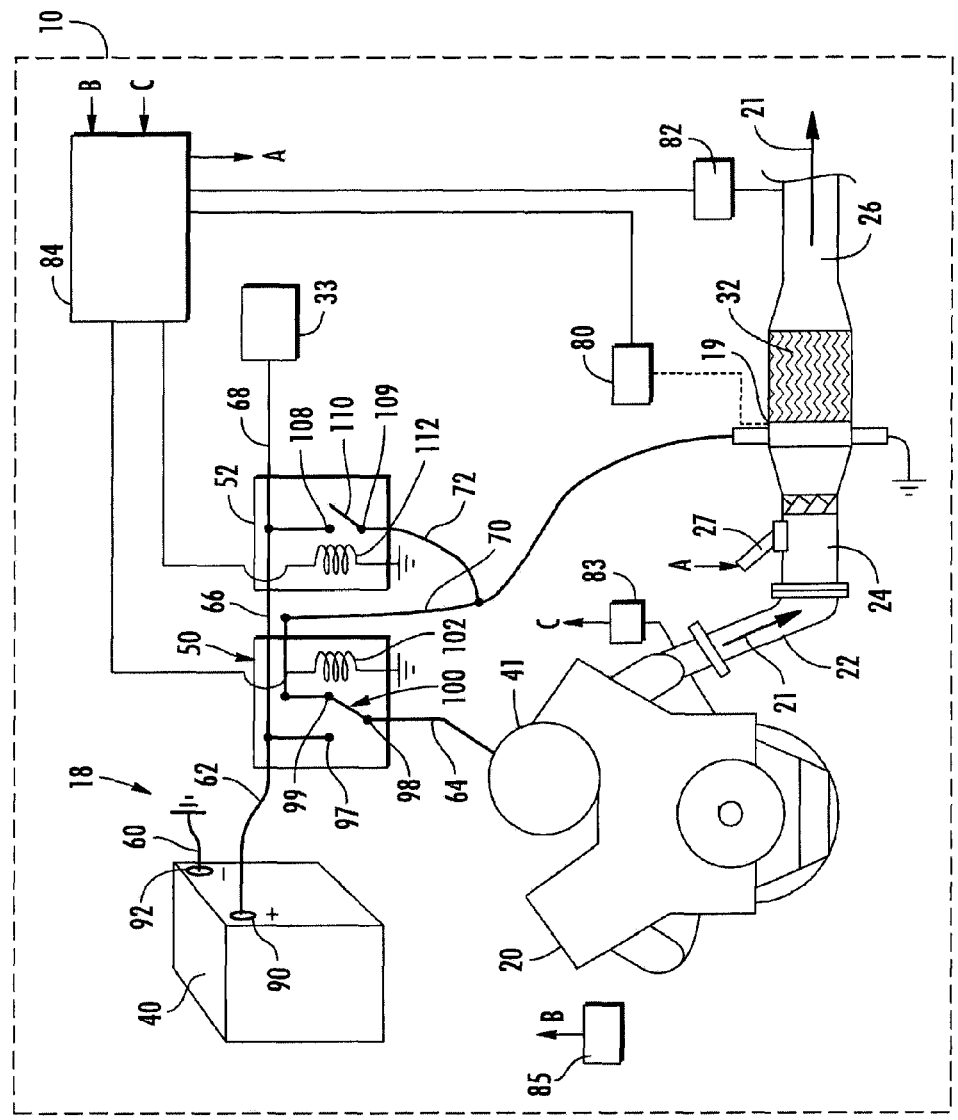
FIG. 1 is a schematic view of a power system for energizing an electrically heated catalyst in accordance with an exemplary embodiment of the invention.

The following description is merely exemplary in nature and is not intended to limit the present disclosure, its application or uses. It should be understood that throughout the drawings, corresponding reference numerals indicate like or corresponding parts and features.

Figure 2:
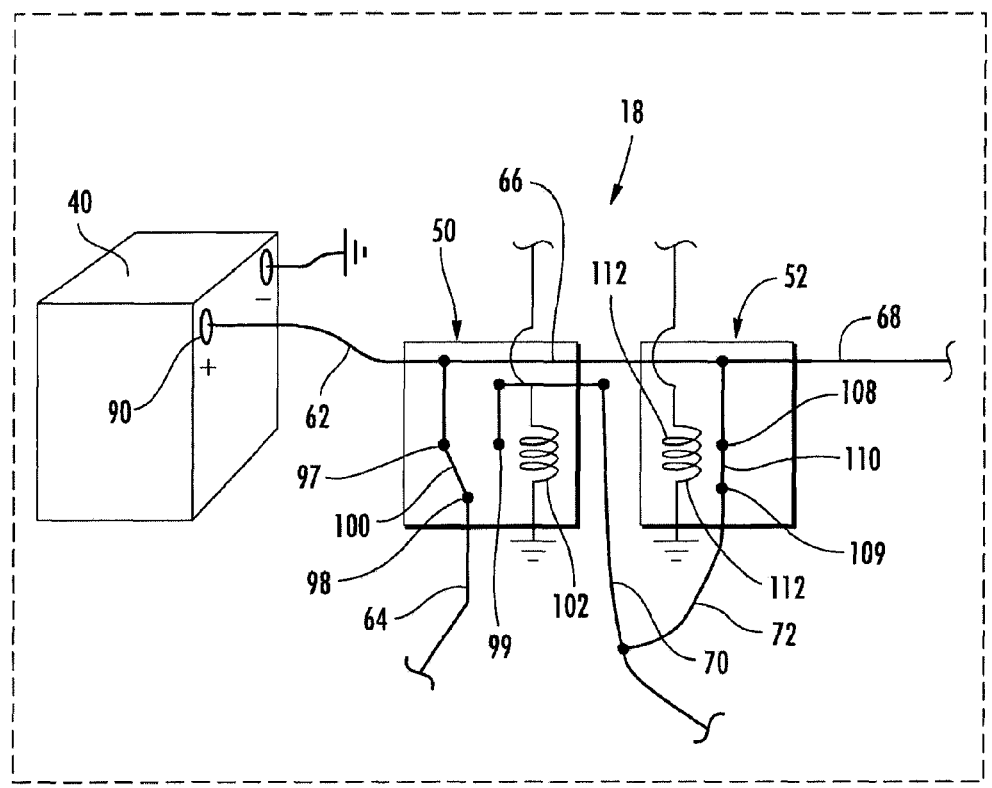
FIG. 2 is a schematic of a two switching devices utilized in the power system of FIG. 1.

Referring to FIGS. 1 and 2, a vehicle 10 having a power system 18 for energizing an electrically heated catalyst 19 in accordance with an exemplary embodiment is provided. The vehicle 10 further includes an engine 20, exhaust pipe sections 22, 24, 26, the electrically heated catalyst 19, a fuel injector 27, an oxidation catalyst 32, and vehicle electrical loads 33.

The engine 20 is provided to supply mechanical power for movement of the vehicle 10. The engine 20 produces exhaust gases 21 that flow through the exhaust pipe sections 22, 24, the electrically heated catalyst 19, the oxidation catalyst 32, and the exhaust pipe section 26. As shown, the exhaust pipe section 22 is coupled to both the engine 20 and the exhaust pipe section 24. Also, the electrically heated catalyst 19 is coupled to both the exhaust pipe section 24 and the oxidation catalyst 32. Finally, the exhaust pipe section 26 is coupled to the oxidation catalyst 32. When the electrically heated catalyst 19 is energized, the catalyst 19 is heated by an electrical current flowing therethrough such that an oxidation of excess carbon monoxide (CO) and hydrocarbons (HC) in the exhaust gases 21 occurs in the catalyst 19 to further increase a temperature of the catalyst 19 and a temperature of exhaust gases flowing therethrough. The carbon monoxide (CO) and hydrocarbons (HC) in the exhaust gases 21 are then further oxidized in the oxidation catalyst 32.

The power system 18 is provided to energize the electrically heated catalyst 19 and to electrically charge a battery 40. The power system 18 includes a generator 41, the battery 40, the switching devices 50, 52, conductors 60, 62, 64, 66, 68, 70, 72, first, second, and third temperature sensors 80, 82, 83, an air flow meter 85, and a controller 84.

The generator 41 is configured to generate a voltage (e.g., a DC voltage) that is received at the positive terminal 90 of the battery 40. In particular, the generator 41 generates an AC voltage when the engine 20 turns a rotor of the generator 41, and then the generator 41 utilizes an internal voltage regulator to convert the AC voltage to a DC voltage that is applied to the conductor 64. In one exemplary embodiment, the generator 41 outputs a DC voltage that is adjustable by control signals from the controller 84, within a range of 0-24 volts for example. In one exemplary embodiment, the generator 41 outputs 24 volts DC when energizing the electrically heated catalyst 19.

The battery 40 has a positive terminal 90 and a negative terminal 92 and is configured to output a first voltage, such as 12 volts for example, between the terminals 90, 92. Of course, in an alternative embodiment, the battery 40 could output voltages less than 12 volts or greater than 12 volts.

The first switching device 50 is electrically coupled between the battery 40 and the second switching device 52. The first switching device 50 has a first operational state (shown in FIG. 1) such that a voltage from the generator 41 is applied through the first switching device 50 to the electrically heated catalyst 19. Also, the first switching device 50 has a second operational state (shown in FIG. 2) such that the voltage of the generator 41 is not applied through the first switching device 50 to the electrically heated catalyst 19. Instead, when the first switching device 50 has the second operational state (shown in FIG. 2) a voltage from the generator 41 is applied through the first switching device 50 to the battery 40 and to the node 108 of the second switching device 52.

The first switching device 50 includes a switch 100, an internal coil 102, and nodes 97, 98, 99. The switch 100 is coupled to the node 98 and is actuated between a first operational position in which the switch 100 is electrically connected between the nodes 98, 97, and a second operational position in which the switch 100 is electrically connected between the nodes 98, 99, by energization and de-energization of the internal coil 102. The node 97 is electrically coupled to the positive terminal 90 of the battery 40 via the conductor 62. Also, the node 98 is electrically coupled to the generator 41 via the conductor 64, and the node 99 is electrically coupled to the electrically heated catalyst 19 via the conductor 70.

The second switching device 52 is electrically coupled between the first switching device 50 and the vehicle electrical loads 33. The second switching device 52 is also electrically coupled to the electrically heated catalyst 19. The second switching device 52 has a first operational state (shown in FIG. 2) such that a voltage from the battery 40 is applied through the second switching device 52 to the electrically heated catalyst 19. Also, the second switching device 52 has a second operational state (shown in FIG. 1) such that the voltage of the battery 40 is not applied through the second switching device 52 to the electrically heated catalyst 19.

The second switching device 52 includes a switch 110, an internal coil 112, and nodes 108, 109. The switch 110 is coupled to the node 109 and is actuated between a first operational position in which the switch 100 is electrically connected between the nodes 109, 108, and a second operational position in which the switch 100 is not electrically connected to the node 108, by energization and de-energization of the internal coil 112. The node 108 is electrically coupled to the node 97 via the conductor 66, and is further electrically coupled to the vehicle electrical loads 33 via the conductor 68. Also, the node 109 is electrically coupled to the conductor 70 and the electrically heated catalyst 19 via the conductor 72.

The first temperature sensor 80 is configured to generate a signal indicative of a temperature level of the electrically heated catalyst 19. The first temperature sensor 80 is disposed proximate to the catalyst 19 and communicates with the controller 84. The second temperature sensor 82 is configured to generate a signal indicative of a temperature level of exhaust gases downstream of the oxidation catalyst 32. The second temperature sensor 82 communicates with the controller 84. The third temperature sensor 83 is configured to generate a signal indicative of a temperature level of exhaust gases exiting the engine 20. The third temperature sensor 83 communicates with the controller 84.

The air flow meter 85 is configured to generate a signal indicative a flow rate of air into the engine 20 which is further indicative of an exhaust gas 21 flow rate from the engine 20. The air flow meter 85 communicates with the controller 84.

The controller 84 is configured to control the operation of the engine 20, the fuel injector 27, the generator 41, the first and second switching devices 50, 52, and the electrically heated catalyst 19, as will be explained in greater detail below. In one exemplary embodiment, the controller 84 is a microprocessor. However, in an alternative embodiment, the controller 84 could be a solid-state circuit.

Figure 3:
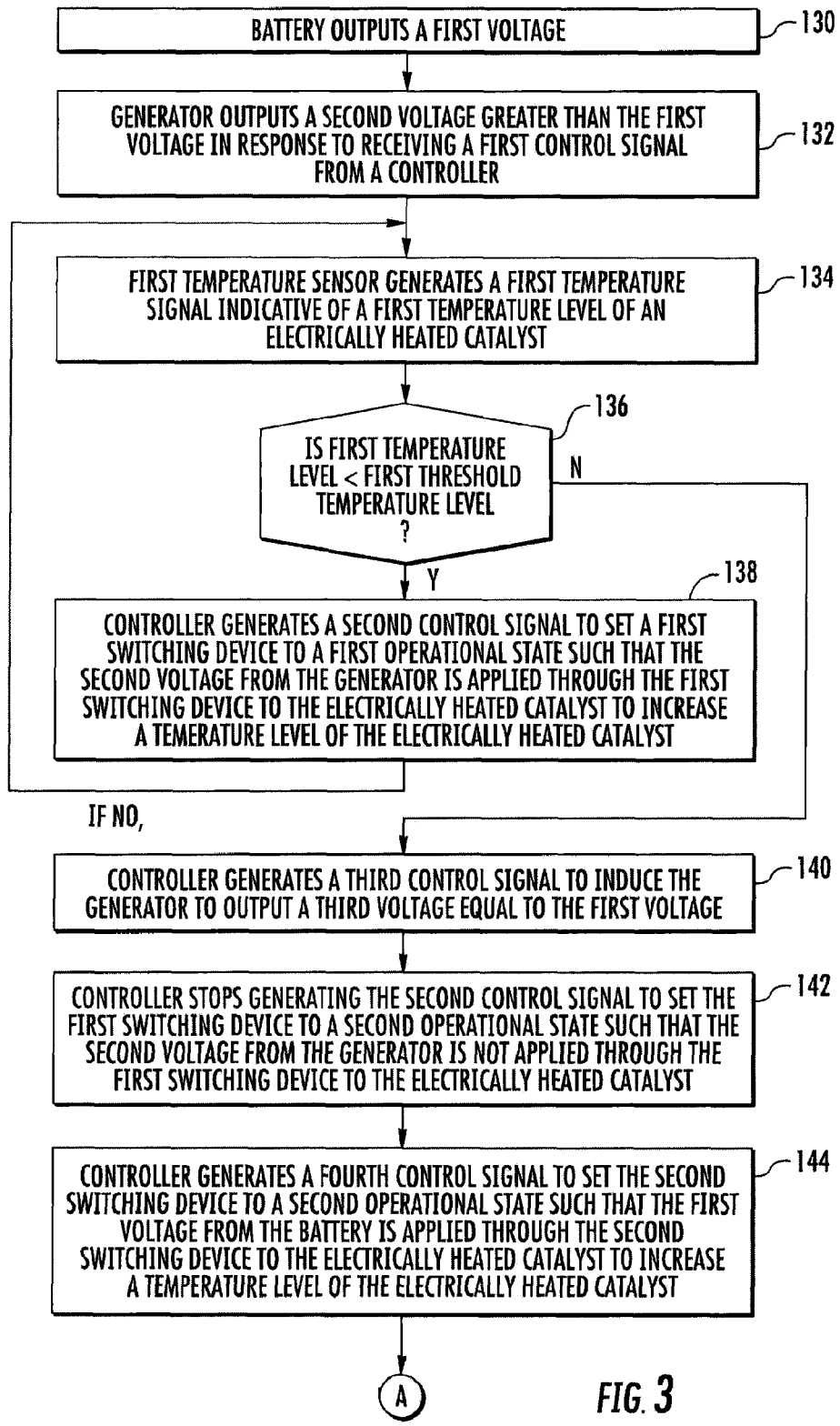
FIGS. 3 and 4 are flow diagrams of a method for energizing an electrically heated catalyst in accordance with another exemplary embodiment of the invention.
Figure 4:
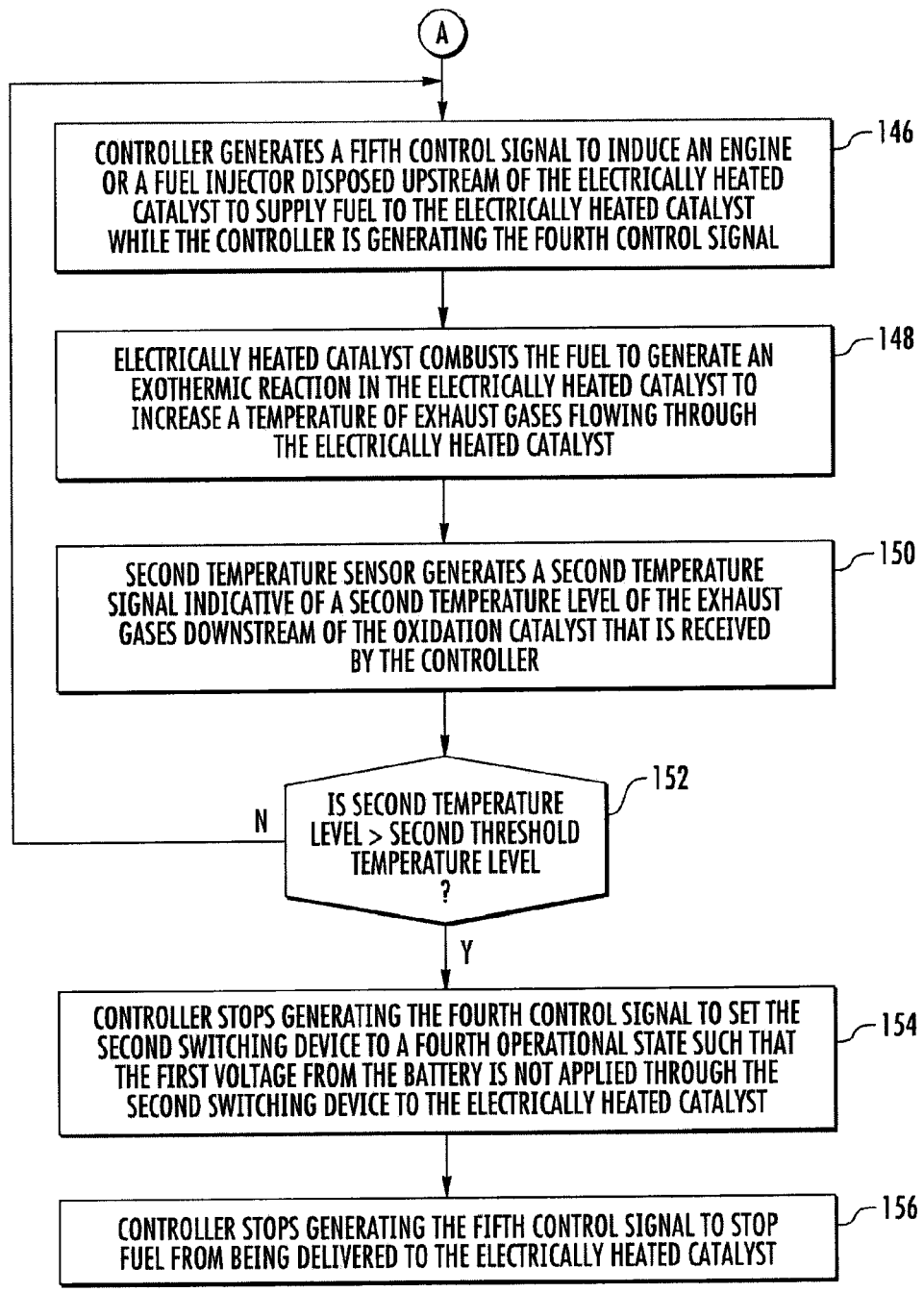

Referring to FIGS. 3 and 4, flow diagrams of a method for energizing the electrically heated catalyst 19 in accordance with another exemplary embodiment is provided. At step 130, the battery 40 outputs a first voltage. In one exemplary embodiment, the first voltage is 12 volts DC. Of course, in an alternative embodiment, the first voltage can be less than or greater than 12 volts DC.

At step 132, the generator 41 outputs a second voltage greater than the first voltage in response to receiving a first control signal from the controller 84. In one exemplary embodiment, the second voltage is 24 volts DC. Of course, in an alternative embodiment, the second voltage can be less than or greater than 24 volts DC.

At step 134, the first temperature sensor 80 generates a first temperature signal indicative of a first temperature level of the electrically heated catalyst 19. In an alternative embodiment, the step 134 may be replaced with the following step: the controller 84 calculates the first temperature level of the electrically heated catalyst 19 utilizing the following equation: first temperature level=f (an amount of electrical power applied to the electrically heated catalyst 19, an exhaust gas temperature level from the engine 20, and an exhaust gas flow rate from the engine 20) wherein f corresponds to an empirically determined mathematical function.

At step 136, the controller 84 makes a determination as to whether the first temperature level is less than a first threshold temperature level. In one exemplary embodiment, the first threshold temperature level is 200 degrees Celsius. Of course, in an alternative embodiment, the first threshold temperature level could be less than or greater than 200 degrees Celsius.

If the value of step 136 equals "yes", the method advances to step 138. Otherwise, the method advances to step 140.

At step 138, the controller 84 generates a second control signal to set a first switching device 50 to a first operational state such that the second voltage from the generator 41 is applied through the first switching device 50 to the electrically heated catalyst 19 to increase a temperature level of the electrically heated catalyst 19. After step 138, the method returns to step 134.

Referring again to step 136, if the value of step 136 equals "no", the method advances to step 140. At step 140, the controller 84 generates a third control signal to induce the generator 41 to output a third voltage equal to the first voltage.

At step 142, the controller 84 stops generating the second control signal to set the first switching device 50 to a second operational state such that the second voltage from the generator 41 is not applied through the first switching device 50 to the electrically heated catalyst 19.

At step 144, the controller 84 generates a fourth control signal to set the second switching device 52 to a second operational state such that the first voltage from the battery 40 is applied through the second switching device 52 to the electrically heated catalyst 19 to increase a temperature level of the electrically heated catalyst 19.

At step 146, the controller 84 generates a fifth control signal to to induce the engine 20 or the fuel injector 27 disposed upstream of the electrically heated catalyst 19 to supply fuel to the electrically heated catalyst 19 while the controller 84 is generating the fourth control signal. In particular, in one exemplary embodiment, the controller 84 generates the fifth control signal to induce fuel injectors within the engine 20 to post-inject fuel into engine cylinders during an exhaust stroke of the cylinders such that the fuel in the exhaust gases 21 from the engine 20 are received by the catalyst 19. In another exemplary embodiment, the controller 84 generates the fifth control signal to induce the fuel injector 27 to inject fuel or urea into the exhaust gases upstream of the catalyst 19.

At step 148, the electrically heated catalyst 19 combusts the fuel to generate an exothermic reaction in the electrically heated catalyst 19 to increase a temperature of exhaust gases 21 flowing through the electrically heated catalyst 19.

At step 150, the second temperature sensor 82 generates a second temperature signal indicative of a second temperature level of the exhaust gases 21 downstream of the oxidation catalyst 32 that is received by the controller 84.

At step 152, the controller 84 makes a determination as to whether the second temperature level is greater than a second threshold temperature level. The second threshold temperature level is greater than the first threshold temperature level. In one exemplary embodiment, the second threshold temperature level is within a range of 250-350 degrees Celsius. If the value of step 152 equals "no", the method returns to step 146. If the value of step 152 equals "yes", the method advances to step 154.

At step 154, the controller 84 stops generating the fourth control signal to set the second switching device 52 to a fourth operational state such that the first voltage from the battery 40 is not applied through the second switching device 52 to the electrically heated catalyst 19.

At step 156, the controller 84 stops generating the fifth control signal to stop fuel from being delivered to the electrically heated catalyst 19.

The power system and the method for energizing the electrically heated catalyst 19 provide a substantial advantage over other systems and methods. In particular, the power system and method provide a technical effect of applying a first voltage to the electrically heated catalyst 19 to increase a temperature of the catalyst 19 to start combustion of fuel in the catalyst 19 and thereafter applies to second voltage to the catalyst 19 to maintain combustion of fuel in the catalyst 19.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A power system for energizing an electrically heated catalyst of a traditional internal combustion vehicle, the electrically heated catalyst being disposed upstream of an oxidation catalyst, comprising:
    a battery configured to output a first voltage, wherein the first voltage is about 12V;
    a generator configured to output a second voltage greater than the first voltage in response to receiving a first control signal;
    a first temperature sensor configured to generate a first temperature signal indicative of a first temperature level of the electrically heated catalyst;
    a second temperature sensor configured to generate a second temperature signal indicative of a second temperature level of the exhaust gases downstream of the oxidation catalyst;
    a controller configured to generate a second control signal to set a first switching device to a first operational state such that the second voltage from the generator is applied through the first switching device to the electrically heated catalyst to increase a temperature of the electrically heated catalyst, based on the first temperature level of the electrically heated catalyst being less than a first threshold temperature level;
    the controller further configured to generate a third control signal to induce the generator to output a third voltage equal to the first voltage, based on the first temperature level of the electrically heated catalyst exceeding the first threshold temperature level;
    the controller further configured to stop generating the second control signal to set the first switching device to a second operational state such that the second voltage from the generator is not applied through the first switching device to the electrically heated catalyst, based on the first temperature level of the electrically heated catalyst exceeding the first threshold temperature level;
    the controller further configured to generate a fourth control signal to set a second switching device to a second operational state such that the first voltage from the battery is applied through the second switching device to the electrically heated catalyst to increase the temperature of the electrically heated catalyst, based on the first temperature level of the electrically heated catalyst exceeding the first threshold temperature level; and
    the controller is further configured to stop generating the fourth control signal such that the first voltage from the battery is not applied through the second switching device to the electrically heated catalyst based on the second temperature level is greater than or equal to a second threshold temperature level, the second threshold temperature level being greater than the first threshold temperature level;

wherein when the second temperature level is greater than or equal to the second threshold temperature level, neither the battery nor the generator is electrically connected to the electrically heated catalyst and when the first temperature level of the electrically heated catalyst exceeds the first threshold temperature level the generator is not electrically connected to the electrically heated catalyst.

2. The power system of claim 1, wherein the controller is further configured to generate a fifth control signal to induce an engine, or a fuel injector, or a combination thereof, upstream of the electrically heated catalyst to supply fuel to the electrically heated catalyst while the controller is generating the fourth control signal.

3. The power system of claim 2, wherein the electrically heated catalyst combusts the fuel to generate an exothermic reaction in the electrically heated catalyst to increase a temperature of exhaust gases flowing through the electrically heated catalyst.

4. The power system of claim 1, wherein the controller is configured to calculate the first temperature level based on an amount of power applied to the electrically heated catalyst, an exhaust gas temperature level from an engine, and an exhaust gas flow rate from the engine.

5. The power system of claim 1, wherein the second voltage is 24 volts.

6. A method for energizing an electrically heated catalyst of a traditional internal combustion vehicle, the electrically heated catalyst being disposed upstream of an oxidation catalyst, comprising:

outputting a first voltage from a battery, wherein the first voltage is about 12V;

outputting a second voltage from a generator that is greater than the first voltage in response to the generator receiving a first control signal;

utilizing a controller to generate a second control signal to set a first switching device to a first operational state such that the second voltage from the generator is applied through the first switching device to the electrically heated catalyst to increase a temperature of the electrically heated catalyst, based on a first temperature level of the electrically heated catalyst being less than a first threshold temperature level;

generating a first temperature signal indicative of the first temperature level of the electrically heated catalyst, utilizing a first temperature sensor operably coupled to the controller;

generating a second temperature signal indicative of a second temperature level of the exhaust gases downstream of the oxidation catalyst utilizing a second temperature sensor operably coupled to the controller;

utilizing the controller to generate a third control signal to induce the generator to output a third voltage equal to the first voltage based on the first temperature level of the electrically heated catalyst exceeding the first threshold temperature level;

stopping the generating of the second control signal to set the first switching device to a second operational state such that the second voltage from the generator is not applied through the first switching device to the electrically heated catalyst based on the first temperature level of the electrically heated catalyst exceeding the first threshold temperature level; and utilizing the controller to generate a fourth control signal to set a second switching device to a second operational state such that the first voltage from the battery is applied through the second switching device to the electrically heated catalyst to increase the temperature of the electrically heated catalyst, based on the first temperature level is greater than or equal to the first threshold temperature level stopping the generating the fourth control signal such that the first voltage from the battery is not applied through the second switching device to the electrically heated catalyst based on the second temperature level is greater than or equal to a second threshold temperature level, the second threshold temperature level being greater than the first threshold temperature level;

wherein when the second temperature level is greater than or equal to the second threshold temperature level neither the battery nor the generator is electrically connected to the electrically heated catalyst and when the first temperature level of the electrically heated catalyst exceeds the first threshold temperature level the generator is not electrically connected to the electrically heated catalyst.

7. The method of claim 6, further comprising generating a fifth control signal to induce an engine, or a fuel injector, or a combination thereof, disposed upstream of the electrically heated catalyst to supply fuel to the electrically heated catalyst while the controller is generating the fourth control signal.

8. The method of claim 6, further comprising calculating the first temperature level based on an amount of power applied to the electrically heated catalyst, an exhaust gas temperature level from an engine, and an exhaust gas flow rate from the engine.

9. The method of claim 6, wherein the second voltage is 24 volts.

* * * * *